United States Patent
Alderman et al.

(10) Patent No.: US 12,103,885 B2
(45) Date of Patent: Oct. 1, 2024

(54) ENHANCED STRENGTH OF GLASS BY COMBINING REDRAW AND CHEMICAL THINNING PROCESSES

(71) Applicant: CORNING INCORPORATED, Corning, NY (US)

(72) Inventors: Bethany Jon Alderman, Bath, NY (US); Patrick Joseph Cimo, Corning, NY (US); Kuan-Ting Kuo, Chubei (TW); Robert Lee Smith, III, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 750 days.

(21) Appl. No.: 17/269,558

(22) PCT Filed: Aug. 6, 2019

(86) PCT No.: PCT/US2019/045190
§ 371 (c)(1),
(2) Date: Feb. 19, 2021

(87) PCT Pub. No.: WO2020/040973
PCT Pub. Date: Feb. 27, 2020

(65) Prior Publication Data
US 2021/0331961 A1    Oct. 28, 2021

Related U.S. Application Data

(60) Provisional application No. 62/719,801, filed on Aug. 20, 2018.

(51) Int. Cl.
*B32B 15/04*  (2006.01)
*B32B 17/06*  (2006.01)
(Continued)

(52) U.S. Cl.
CPC .............. *C03B 23/037* (2013.01); *C03C 4/18* (2013.01); *C03C 10/0018* (2013.01);
(Continued)

(58) Field of Classification Search
CPC .................................................. C03C 21/002
(Continued)

(56) References Cited

U.S. PATENT DOCUMENTS 9,321,679 B2 *  4/2016  Chang ................... G06F 1/1652
9,957,190 B2 *  5/2018  Finkeldey ......... B32B 17/10137
(Continued)

FOREIGN PATENT DOCUMENTS

CA           2201503 A1    4/1996
CN         102741187 A    10/2012
(Continued)

OTHER PUBLICATIONS

Gulati et al., "45.2: Two point bending of thin glass substrates," in SID 11 Digest, 2011, pp. 652-654.
(Continued)

*Primary Examiner* — Lauren R Colgan
(74) *Attorney, Agent, or Firm* — Jeffrey A. Schmidt

(57) ABSTRACT

A cover element for an electronic device that includes a glass element having a thickness from 20 μm to 125 μm, a first primary surface, a second primary surface, a compressive stress region extending from the first primary surface to a first depth, and a polymeric layer disposed over the first primary surface. Further, the glass element has a stress profile such that it has a bend strength of about 1850 MPa or more at a 10% failure probability, wherein the cover element is made by a multi-step method that employs a redraw thinning step and at least two chemical etching steps.

20 Claims, 5 Drawing Sheets

(51) Int. Cl.
*C03B 23/037* (2006.01)
*C03C 4/18* (2006.01)
*C03C 10/00* (2006.01)
*C03C 15/00* (2006.01)
*C03C 21/00* (2006.01)

(52) U.S. Cl.
CPC ............ *C03C 15/00* (2013.01); *C03C 21/002* (2013.01); *C03C 2204/00* (2013.01)

(58) Field of Classification Search
USPC ................................................ 428/410, 426
See application file for complete search history.

(56) References Cited

U.S. PATENT DOCUMENTS

| | | | | |
|---|---|---|---|---|
| 10,271,442 | B2* | 4/2019 | Gross | C03C 3/097 |
| 10,809,766 | B2* | 10/2020 | Chu | B32B 27/36 |
| 2014/0134397 | A1* | 5/2014 | Amin | C03C 10/0045 |
| | | | | 428/141 |
| 2015/0166393 | A1* | 6/2015 | Marjanovic | B23K 26/0622 |
| | | | | 65/61 |
| 2015/0210588 | A1* | 7/2015 | Chang | B32B 17/06 |
| | | | | 428/220 |
| 2015/0210590 | A1* | 7/2015 | Chang | C03C 3/091 |
| | | | | 428/220 |
| 2016/0214889 | A1* | 7/2016 | Garner | C03C 3/087 |
| 2017/0115700 | A1* | 4/2017 | Chang | C03C 21/002 |
| 2017/0152173 | A1* | 6/2017 | Amin | C03C 21/002 |
| 2017/0197870 | A1* | 7/2017 | Finkeldey | C03C 4/18 |
| 2017/0295657 | A1* | 10/2017 | Gross | C03C 21/002 |
| 2017/0338182 | A1* | 11/2017 | Gross | C03C 17/326 |
| 2018/0009197 | A1* | 1/2018 | Gross | C03C 17/007 |
| 2019/0011954 | A1* | 1/2019 | Chu | B32B 17/10 |
| 2019/0050027 | A1* | 2/2019 | Chang | B32B 7/12 |
| 2022/0324202 | A1* | 10/2022 | Chang | B32B 17/10009 |

FOREIGN PATENT DOCUMENTS

| | | |
|---|---|---|
| CN | 104045239 A | 9/2014 |
| CN | 103232171 B | 6/2015 |
| CN | 105102386 A | 11/2015 |
| CN | 105593185 A | 5/2016 |
| EP | 3333137 A1 | 6/2018 |
| WO | 2011/085190 A1 | 7/2011 |
| WO | 2014/045809 A1 | 3/2014 |
| WO | 2014/139147 A1 | 9/2014 |
| WO | 2016/073551 A1 | 5/2016 |
| WO | 2017/013374 A1 | 1/2017 |
| WO | 2017/095791 A1 | 6/2017 |

OTHER PUBLICATIONS

Chinese Patent Application No. 201980055274.1, Office Action, dated Jul. 22, 2022, 18 pages, (10 pages of English Translation and 8 pages of Original Copy); Chinese Patent Office.

International Search Report and Written Opinion of the International Searching Authority; PCT/US19/45190; Mailed Nov. 29, 2019; 11 Pages; European Patent Office.

* cited by examiner

ENHANCED STRENGTH OF GLASS BY COMBINING REDRAW AND CHEMICAL THINNING PROCESSES

CROSS-REFERENCE TO RELATED APPLICATIONS

This application is a national stage entry of International Patent Application Serial No. PCT/US2019/045190, filed on Aug. 6, 2019, which in turn, claims the benefit of priority under 35 U.S.C. § 119 of U.S. Provisional Application Ser. No. 62/719,801 filed on Aug. 20, 2018, the contents of each of which are is relied upon and incorporated herein by reference in their entireties.

TECHNICAL FIELD

The disclosure generally relates to thin glass having improved bend strength and surface quality, and methods of making such glass. More particularly, the disclosure relates to a method of making thin glass that can be used for foldable glass elements and articles.

BACKGROUND

Flexible versions of products and components that are traditionally rigid in nature are being conceptualized for new applications. For example, flexible electronic devices can provide thin, lightweight and flexible properties that offer opportunities for new applications, for example curved displays and wearable devices. Many of these flexible electronic devices use flexible substrates for holding and mounting the electronic components of these devices. For example metal foils have some advantages including thermal stability and chemical resistance, but suffer from high cost and a lack of optical transparency. Polymeric foils have some advantages including resistance to fatigue failure, but suffer from marginal optical transparency, lack of thermal stability and limited hermeticity.

Some of these electronic devices also can make use of flexible displays. Optical transparency and thermal stability are often desirable properties for flexible display applications. In addition, flexible displays should have high fatigue and puncture resistance, including resistance to failure at small bend radii, particularly for flexible displays that have touch screen functionality and/or can be folded.

Conventional flexible glass materials offer many of the beneficial properties for flexible substrate and/or display applications. However, efforts to harness glass materials for these applications have been largely unsuccessful to date. Generally, glass substrates can be manufactured to very low thickness levels (<25 µm) to achieve smaller and smaller bend radii. These "thin" glass substrates suffer from limited puncture resistance. At the same time, thicker glass substrates (>150 µm) can be fabricated with better puncture resistance, but these substrates lack suitable fatigue resistance and mechanical reliability upon bending. Thus, there is a desire for glass materials, components and assemblies for reliable use in flexible substrate and/or display applications and functions, particularly for flexible electronic device applications.

SUMMARY

In a first aspect, there is a method of making a glass-based element, including the steps of: redrawing a preform glass sheet to form a redrawn glass sheet; cutting the redrawn glass sheet to obtain a redrawn glass part, the redrawn glass part comprising a first surface and a second surface; in a first chemical etching step, contacting the first and/or second redrawn glass part surfaces with a first etchant to form a chemically etched redrawn glass part; subjecting the chemically etched redrawn glass part to an ion exchange step to form an ion-exchanged redrawn glass part, the ion-exchanged redrawn glass part having a compressive stress region, a first surface and a second surface, the compressive stress region extending from the first surface of the ion-exchanged redrawn glass part to a first depth in the ion-exchanged redrawn glass part; and, in a second chemical etching step, contacting the first and/or second ion-exchanged redrawn glass part surfaces with a second etchant to form a glass-based element.

In some examples of aspect 1, the preform glass sheet is fed into a redraw furnace and heated to a viscosity from about $10^5$ to about $10_7$ poise and drawn to a final average thickness of from about 25 to 200 micrometers (microns or µm).

In another example of aspect 1, the method further includes a step of edge finishing the redrawn glass part prior to the first chemical etching step.

In another example of aspect 1, the first chemical etching step includes a first pass etching and a second pass etching.

In another example of aspect 1, the first etchant contains a first acid and the second etchant contains a second acid, and wherein the concentration of the first acid in the first etchant is greater than the concentration of the second acid in the second etchant.

In another example of aspect 1, the preform glass sheet has an average thickness of from about 250 microns to about 1,300 microns.

In another example of aspect 1, the redrawn glass part has an average thickness of from about 75 to about 200 microns.

In another example of aspect 1, the chemically etched redrawn glass part has an average thickness of from about 25 to about 125 microns.

In another example of aspect 1, the glass-based element has an average thickness of from about 20 to about 125 microns.

In another example of aspect 1, the glass-based element has an average thickness of from about 25 to about 60 microns.

In another example of aspect 1, the second etchant removes less than 2 microns of thickness from each of the first and/or second ion-exchanged redrawn glass part surfaces.

In another example of aspect 1, the second chemical etching step removes less than 3 microns of total thickness from the ion-exchanged redrawn glass part.

In another example of aspect 1, the average thickness of the glass-based element is from about 80% to about 95% thinner than the average thickness of the preform glass sheet.

In another example of aspect 1, the preform glass sheet is thinned by up to about 95% during the redrawing step.

In another example of aspect 1, the redrawn glass part is thinned by about 30% to about 80% during the first chemical etching step.

In another example of aspect 1, the ion-exchanged redrawn glass part is thinned by about 4% to about 12% during the second chemical etching step.

In another example of aspect 1, the ion exchange step replaces a relatively smaller alkali metal cation in the chemically redrawn glass part with a relatively larger cation, for example, potassium.

In another example of aspect 1, the method includes a glass-based element for use in a display portion of an electronic device.

In a second aspect, there is a glass-based element having a bend strength of from about 1000 to about 1800 MPa at a failure probability from 1% to 10%.

In another example of aspect 2, the glass-based element has an average thickness of from about 20 to about 60 microns.

In another example of aspect 2, the glass-based element has a glass composition that includes an alkali metal.

In another example of aspect 2, the alkali metal includes lithium or sodium, or a combination thereof.

In another example of aspect 2, the bend strength is greater than 1100 MPa at a failure probability of 1%.

In another example of aspect 2, the glass-based element has an average thickness of less than 75 microns and a bend strength greater than 1400 MPa at a failure probability of 5%.

In a third aspect, there is a consumer electronic product that includes a housing having a front surface, a back surface and side surfaces (e.g., a first side surface and a second side surface). Electrical components are at least partially positioned within the housing and the electrical components can include one or more of a controller, a memory and a display. The display is arranged at or adjacent the front surface of the housing and a cover substrate is disposed over the display, wherein at least one of a portion of the housing or the cover substrate includes a glass-based element, for example from any example of aspects 1 and 2.

Any one of the above aspects (or examples of those aspects) may be provided alone or in combination with any one or more of the examples of that aspect discussed above; e.g., the first aspect may be provided alone or in combination with any one or more of the examples of the first aspect discussed above; and the second aspect may be provided alone or in combination with any one or more of the examples of the second aspect discussed above; and so-forth.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiments, and together with the description serve to explain principles and operation of the various embodiments. Directional terms as used herein—for example, up, down, right, left, front, back, top, bottom—are made only with reference to the figures as drawn and are not intended to imply absolute orientation.

BRIEF DESCRIPTION OF THE DRAWINGS

The above and other features, examples and advantages of aspects or examples of the present disclosure are better understood when the following detailed description is read with reference to the accompanying drawings, in which.

DETAILED DESCRIPTION

Figure 1:
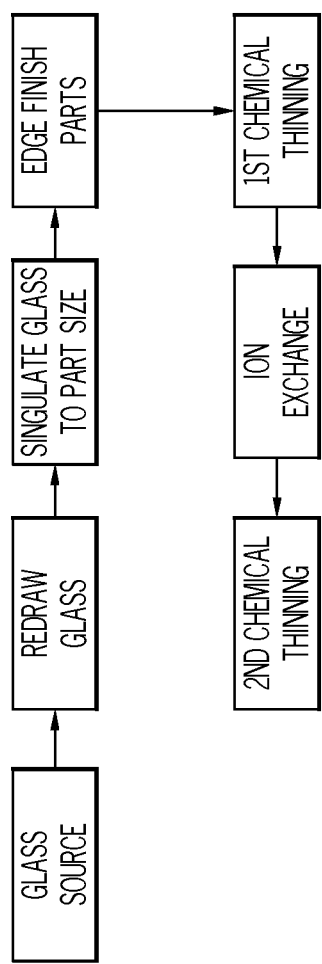
FIG. 1 is a flow chart of a method of forming a glass-based element according to some aspects of the present disclosure.

Reference will now be made in detail to embodiments, examples of which are illustrated in the accompanying drawings. Whenever possible, the same reference numerals will be used throughout the drawings to refer to the same or like parts. Ranges can be expressed herein as from "about" one particular value, and/or to "about" another particular value. When such a range is expressed, some embodiments include from the one particular value and/or to the other particular value. Similarly, when values are expressed as approximations, by use of the antecedent "about," it will be understood that the particular value forms another embodiment. Whether or not a numerical value or end-point of a range in the specification recites "about," the numerical value or end-point of a range is intended to include two embodiments: one modified by "about," and one not modified by "about." It will be further understood that the endpoints of each of the ranges are significant both in relation to the other endpoint, and independently of the other endpoint.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, for example within about 5% of each other, or within about 2% of each other. It also is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue. Thus, a glass that is "free of" or "substantially free of $B_2O_3$," for example, is one in which $B_2O_3$ is not actively added or batched into the glass, but may be present in very small amounts (e.g., <0.001 mol %) as a contaminant. Similar to $B_2O_3$, other components, for example a compound being "free of" or "substantially free of" oxygen, may be characterized in the same manner.

Among other features and benefits, the stack assemblies, glass elements and glass articles, and the multi-step methods of making them, of the present disclosure can provide mechanical reliability (e.g., in static tension and fatigue) at a small bend radii. The small bend radii is beneficial when the stack assembly, glass element, and/or glass article or cover element, are used in a display, for example, one wherein one part of the display (e.g., a foldable display) is folded over on top of another portion of the display. For example, the stack assembly, glass element and/or glass article or cover element, may be used as one or more of: a cover on the user-facing portion of a display, a location wherein puncture resistance is particularly desirable; a substrate, disposed internally within the device itself, on which electronic components are disposed; or elsewhere in a foldable display device. Alternatively, the stack assembly, glass element, and/or glass article, may be used in a device not having a display, but one wherein a glass layer is used for its beneficial properties and is folded, in a similar manner as in a foldable display, to a tight bend radius.

Preparing the glass element follows a multi-step method that includes a selective combination of processes, for example, redraw, etch and chemical strengthening or ion exchange processes, to achieve a thinned glass element having improved strength, for example, bend strength. The methods of the present disclosure are directed to preparing the glass element with a selective combination of processes that can provide unexpected bend strength to the glass element not achievable from any individual process alone. FIG. 1 shows a flow chart of an example multi-step method for forming a glass element having improved bend strength. As shown, the method starts with a starting glass material source, for example, a fusion drawn glass in the form of a preform glass sheet. In the redraw process step, the glass material or preform is heated and then redrawn, for instance in a sheet form, to reduce the thickness of the glass material, which can be greater than about 500 µm, to the desired thickness, e.g., below about 300 µm or in the range of about 50 µm to about 275 µm, for example from about 60 µm to about 265 for example from about 75 µm to about 250 for example from about 80 µm to about 245 for example from about 85 µm to about 235 for example from about 90 µm to about 225 about 100 to about 200 µm, for example from about 110 µm to about 290 for example from about 1200 µm to about 180 or from about 125 µm to about 175 µm, including any ranges and subranges therebetween. To prepare the redrawn glass sheet, a preform glass sheet can be used as the starting glass material and then heated (e.g., in a heating apparatus, furnace or oven), for example, at a temperature in the range of 600° to 1,100° C. In an example redraw process, the redrawn glass can be formed by drawing a base glass material or preform with rollers (e.g., a fusion draw glass) under heating conditions (e.g., 900° to 1,700° C.) to thin the base glass material to the desired thickness in one redraw step, wherein the rollers contact the edges or non-quality area of the glass. Example redraw methods include, for instance, methods as disclosed in WO 2017/095791. The redrawn glass element desirably contains fewer surface defects, for example, scratches, depressions or pits, as compared to glass elements formed by thinning processes other than a redraw process, for example a chemical etching process.

The redrawn glass element can have a smooth surface with reduced surface roughness as compared to glass elements formed by thinning processes other than a redraw process, for example a chemical etching process. In some embodiments, the redraw glass element or parts can have an average surface roughness (Ra) in the range from about 0.1 nm to about 2 nm, about 0.15 nm to about 1 nm, about 0.2 nm to about 0.9 nm, or less than about 0.25 nm, less than about 0.3 nm, less than about 0.4 nm, less than about 0.5 nm, less than about 0.6 nm, less than about 0.7 nm or less than about 0.8 nm, including any ranges and subranges therebetween.

For the redraw process, a starting glass material or preform (e.g., a fusion drawn glass preform) is heated to reach a glass viscosity value in the range of, for example, about $10^5$ to about $10^7$ poise prior to redrawing the glass source preform to the desired target thickness which can be controlled by adjusting the mass balance of the redraw process. The preform glass sheet is fed at a rate of, for example, from 3 to 100 millimeters (mm) per minute at a pull speed from, for example, 50 to 1000 mm per minute to arrive at the target thickness. The redrawn glass can be cooled at a rate to match the expansion curve of the preform glass through a setting zone to arrive at a viscosity in the range of about, for example, $10^9$ to about $10^{15}$ poise.

The redrawn thinned glass sheet can be singulated (e.g., laser singulated) or cut (e.g., water cutting) to form redrawn glass samples or parts having a predetermined shape and dimensions (e.g., a glass cover element or display). The singulated redrawn glass parts can be separate redrawn glass sheet parts used for further processing to arrive at a final glass element for use in a cover element for an electronic device or display. The thinned redrawn glass can be singulated by, for example, mechanical score and break, or laser cutting. This process results in glass substrates having a smooth surface. The edges of the redrawn glass parts (after singulation) are finished to reduce flaws on the edges for improved strength, for example, bend strength. Edge finishing can be achieved by standard methods, for example, acid edge etching or mechanical finishing or polishing of the edge surfaces (e.g., corners and side edge) of redrawn glass parts. Desirably, the flat, primary surface of the redrawn glass parts is not finished by the edge finishing technique.

The redrawn glass parts, for example, edge-finished redrawn glass parts, can be thinned in a first chemical etching step, e.g., as shown in FIG. 1, to form a chemically etched redrawn glass part. The first chemical etching step can be carried out in a single step, or alternatively, in multiple stages or passes. The redrawn glass parts are contacted with a first etchant (e.g., an aqueous acid solution, a hydrochloric or hydrofluoric acid etch solution) to remove glass material from one or more surfaces of the parts to reduce the thickness of the parts to the desired thickness, for example, below about 150 µm, for example in the range of from about 15 µm to about 130 µm, from about 25 µm to about 125 µm, from about 35 µm to about 115 µm, from about 45 µm to about 110 µm, or about 50 to about 100 µm, including any ranges and subranges therebetween.

Contacting the redraw glass parts with the first etchant can be achieved, for example, by conventional etching methods. Etching methods can include submerging the parts in the etchant (static etch) and coating the parts, for example, spray or roller coating. In an example, horizontal etching that coats the top, bottom or both surfaces of the redrawn glass part. In other examples, these materials may be a film or ink that can be coated on the glass structure by lamination or screen printing processes. After the selective etching has been completed, the process can further include washing off the etching solution with deionized water. Washing can include using water at room temperature or heated, for example, deionized water or an aqueous surfactant solution at a temperature in the range of from about 30° to about 50° C.

Various acid etching and/or acid thinning processes can be employed for this purpose as understood by those with ordinary skill in this field. For example, a suitable etching solution can include aqueous acid solutions. Aqueous acid solutions can include acids, for example, hydrofluoric (HF), nitric (HNO$_3$) and/or hydrochloric (HCl). Example aqueous acid solutions include one or more acids in a total concentration in the range of 10 to 40 vol %. For instance, a first etchant can be an aqueous solution of 5 to 20 vol % HF and 5 to 20 vol % HCl, or 5 to 20 vol % HF and 5 to 15 vol % HNO$_3$. The first etchant can be held at a constant temperature for contacting the redrawn glass parts, for example, in a temperature in the range of from about 20° to about 50° C.

By controlling etching time and/or etching solution concentration, a desired final thickness can be obtained in the glass element or chemically etched redrawn glass part. An example etching rate or material removal rate using the first etchant (e.g., first etchant solution) is from about 0.5 µm per minute to about 1.5 µm per minute. In another example, etching rate can be controlled by conveyor speed in spray applications or dwell time in static etching applications. In some aspects of the methods, the material removal process employed to reach the final thickness can be further configured to reduce the maximum flaw size in proximity to a surface of the glass element, e.g., to 5 micrometers (µm, or microns) or less, 2.5 µm or less, 0.5 µm or less, or even lower.

During processing with the first etchant, edges of the glass parts can be subjected to a light etch as contact with the first etchant occurs in certain processing applications (e.g., submersion and spray coating). This light etch of the edges can beneficially improve their strength. In particular, cutting or singling processes employed to section the redrawn glass structure into parts before the etching process is employed can leave flaws and other defects within the surface of the glass structure. These flaws and defects can propagate and cause glass breakage during the application of stresses to the stack assembly from the application environment and usage. The acid etching process, which can include lightly etching these edges, can remove at least some of these flaws, thereby increasing the strength and/or fracture resistance of the edges of the stack assembly.

The chemically etched redrawn glass element or parts can be further processed by subjecting the element or parts to an ion exchange step. The ion exchange step typically does not further reduce the thickness of the glass element but rather, as described herein, the ion exchange step can form a compressive stress region in the glass element. The ion exchange step can replace some ion-exchangeable ions in the glass element (e.g., Na$^+$ ions) with ion-exchanging ions (e.g., K$^+$ ions) present in an ion-exchange material. The higher compression stresses may be the result of ion exchange wherein K$^+$ ions effectively replacing some Na$^+$ ions at or near the selectively exposed surface portions of the glass element.

The ion exchange step can be carried out by contacting the chemically etched redrawn glass element or parts with the ion-exchange material for a specified amount of time. The contact time between the ion-exchange material and the chemically etched redrawn glass element or parts can depend on the thickness of the glass. In some aspects of the ion exchange step, the chemically etched redrawn glass element or parts can be in contact with the ion-exchange material (e.g., in a single step or multi-step process) for a period of about 10 minutes to about 8 hours, about 15 minutes to about 4 hours, about 20 minutes to about 2 hours, about 30 minutes to about 90 minutes, or about 30, 45, 60 or 75 minutes, including any ranges and subranges therebetween. The ion-exchange material can be held at an elevated temperature while in contact with the glass element or part. For example, the ion-exchange material can be at a temperature in the range of from about 250° to about 550° C., about 275° to about 475° C., about 300° to about 450° C., about 350° to about 425° C. or about 375°, 400° or 410° C., including any ranges and subranges therebetween.

Prior to contact with the ion exchange material, the chemically etched redrawn glass element or parts can be pre-heated. In one example, the chemically etched redrawn glass element or parts can be heated to a temperature in the range of about 250° to about 500° C., about 275° to about 450° C., about 300° to about 400° C. or about 325° to 375° C., including any ranges and subranges therebetween. Heating of the chemically etched redrawn glass element or parts can be carried out in conventional equipment (e.g., oven) for any desirable time period, for example, about 20 minutes to about 4 hours, about 30 minutes to about 2 hours or about 45 minutes to 90 minutes. In one example, the chemically etched redrawn glass element or parts can be heated from room temperature to a temperature in the range of about 325° to about 375° C. over a period of about 30 minutes to 60 minutes before being brought into contact with an ion exchange material.

Ion exchange material can include compounds capable of supplying ion-exchanging ions with glass, wherein the glass can be any glass containing ions that can be ion-exchanged for larger ions, for example, exchanging sodium and/or lithium ions in the glass for potassium and/or sodium ions. The ion exchange material can be in any suitable medium, a paste, a molten liquid, salt bath, frit, etc. One example of an ion-exchanging material is KNO$_3$. After contact with the ion exchange material is complete, the glass element or parts can be washed to remove the ion-exchange material from the surfaces to arrive at an ion-exchanged redrawn glass element or part. Water (e.g., deionized water) can be used as a wash liquid.

The ion-exchanged redrawn glass element or part can be further thinned in a second chemical etching step to form the glass element. The ion-exchanged redrawn glass element or parts are contacted with a second etchant (e.g., an aqueous acid solution) to remove glass material from one or more surfaces of the parts to reduce the thickness of the parts to the desired thickness, for example, below about 100 µm or in the range of from about 10 µm to about 90 µm, from about 20 µm to about 80 µm from about 25 µm to about 75 µm, or about 30 to about 70 µm, or from about 35 µm to about 65 µm, or from about 40 µm to about 60 µm, including any ranges and subranges therebetween. The second chemical etching step can remove glass material from one or more surfaces of the glass element, for example, glass material can be removed in an amount in the range of about 0.5 µm to about 15 µm, about 0.5 µm to about 10 µm, about 0.5 µm to about 5 µm, about 0.5 µm to about 2 µm, about 0.5 µm to about 1 µm, about 0.75 µm to about 5 µm, about 0.85 µm to about 5 µm, about 0.90 µm to about 5 µm, about 1 µm to about 12 µm, about 2 µm to about 10 µm, or about 3 µm to about 8 µm.

Contacting the ion-exchanged redrawn glass element or parts with the second etchant can be achieved by conventional etching methods as described above for the first etching step, for example, submerging the parts in the etchant (static etch) and coating the parts by spray or roller coating. In some examples, horizontal etching coats the top, bottom or both surfaces of the redrawn glass part. In other examples, these materials may be a film or ink that can be coated on the glass structure by lamination or screen printing processes. After the selective second etching has been completed, the process can further include washing off the etching solution with deionized water. Washing can include using water at room temperature or heated, for example, deionized water or an aqueous surfactant solution at a temperature in the range of about 30 to about 50° C.

The second etchant can include solutions or aqueous acid solutions, for example, solution with an acid or combination of acids. Acids can include hydrofluoric (HF), nitric (HNO$_3$) and/or hydrochloric (HCl). Example aqueous acid solutions include one or more acids in a total concentration in the range of 10 to 40 vol %. For instance, a second etchant can be an aqueous solution of 5 to 20 vol % HF and 5 to 20 vol % HCl, or 5 to 20 vol % HF and 5 to 15 vol % HNO$_3$. The second etchant can be held at a constant temperature for contacting the ion-exchanged redrawn glass parts, for example, in a temperature in the range of about 20 to about 50° C.

Figure 2:
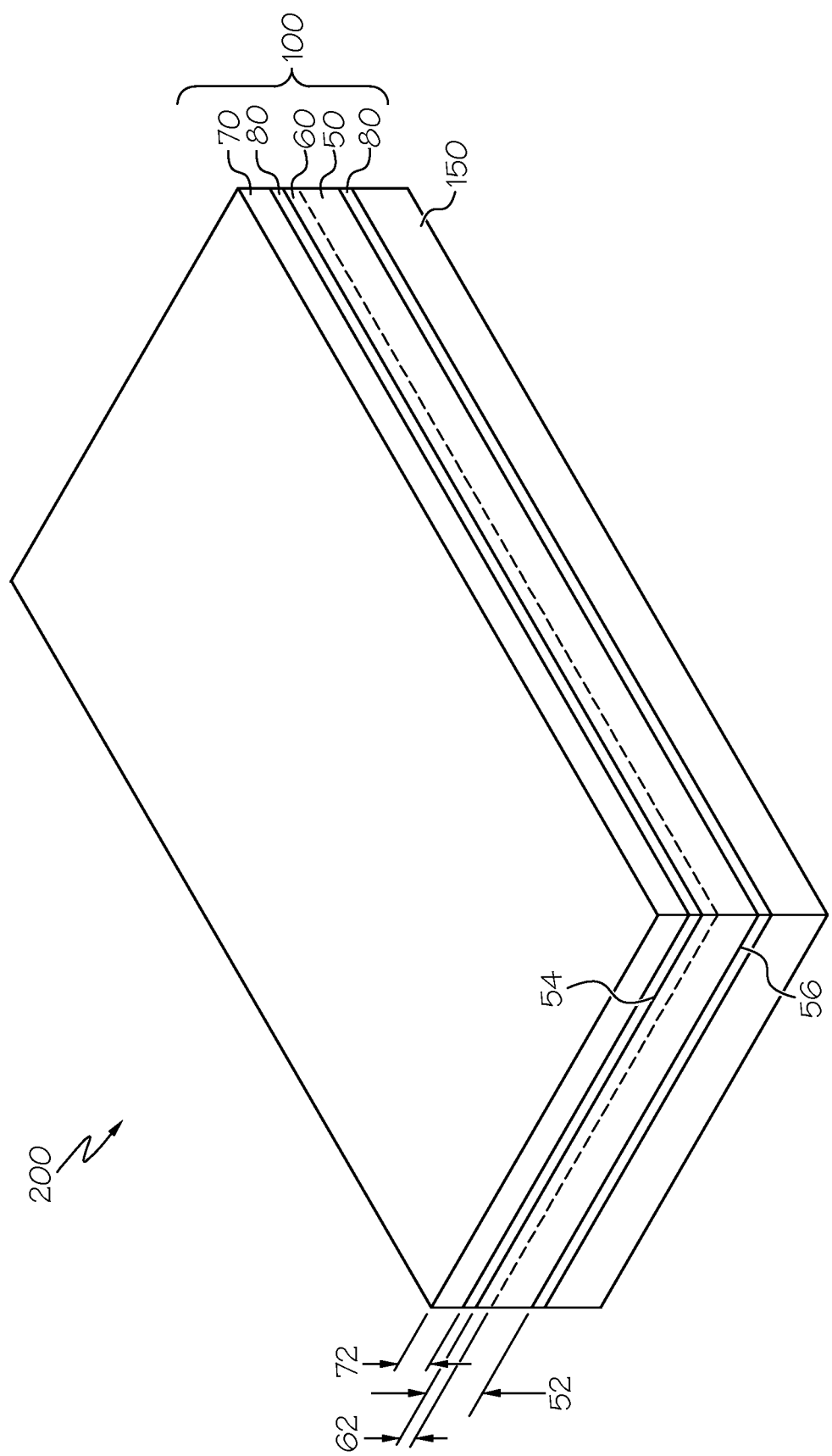
FIG. 2 is a cross-sectional view of a stack assembly including a strengthened glass layer according to some aspects of this disclosure.

FIG. 2 shows a stack assembly 100 that includes a glass element 50. Glass element 50 has a glass element thickness 52, a first primary surface 54 and a second primary surface 56. Thickness 52 can range from about 25 µm to about 125 µm in some aspects. In other aspects, thickness 52 can range from about 50 µm to about 100 µm, or about 60 µm to about 80 µm, or the ranges of other thicknesses discussed with respect to the glass parts. Thickness 52 can also be set at other thicknesses between the foregoing ranges.

The glass element 50 may include one or more glass layers with a glass layer first primary surface and a glass layer second primary surface. In addition, glass layer also includes edges, generally configured at right angles to the glass layer first and second primary surfaces. Glass layer is further defined by a glass layer thickness. In some aspects of stack assembly 100 depicted in FIGS. 2 and 3, the glass element 50 includes one glass layer. As a consequence, the glass layer thickness 52 is comparable to the glass element thickness 52 for stack assembly 100. In other aspects, glass element 50 can include two or more glass layers. As such, the thickness of a glass layer can range from about 1 µm to about 125 µm. It should also be understood, however, that glass element 50 could include other non-glass layers (e.g., compliant polymer layers) in addition to one or more glass layers. Further, the element 50 may be a glass-based element, i.e., it may be made of, or include, ceramic and/or glass-ceramic materials in some embodiments.

Further, as used herein the term "glass" is meant to include any material made at least partially of glass, including glass and glass-ceramics. "Glass-ceramics" include materials produced through controlled crystallization of glass. In some embodiments, glass-ceramics have about 30% to about 90% crystallinity. Non-limiting examples of glass ceramic systems that may be used include Li$_2$O×Al$_2$O$_3$×nSiO$_2$ (i.e., an LAS system), MgO×Al$_2$O$_3$×nSiO$_2$ (i.e., a MAS system), and ZnO×Al$_2$O$_3$×nSiO$_2$ (i.e., a ZAS system). The term "glass-based" is meant to include glass, glass-ceramic, and ceramic, material, so that a "glass-based element" may be made wholly, or partially, of glass, glass-ceramic, and/or ceramic.

Figure 3:
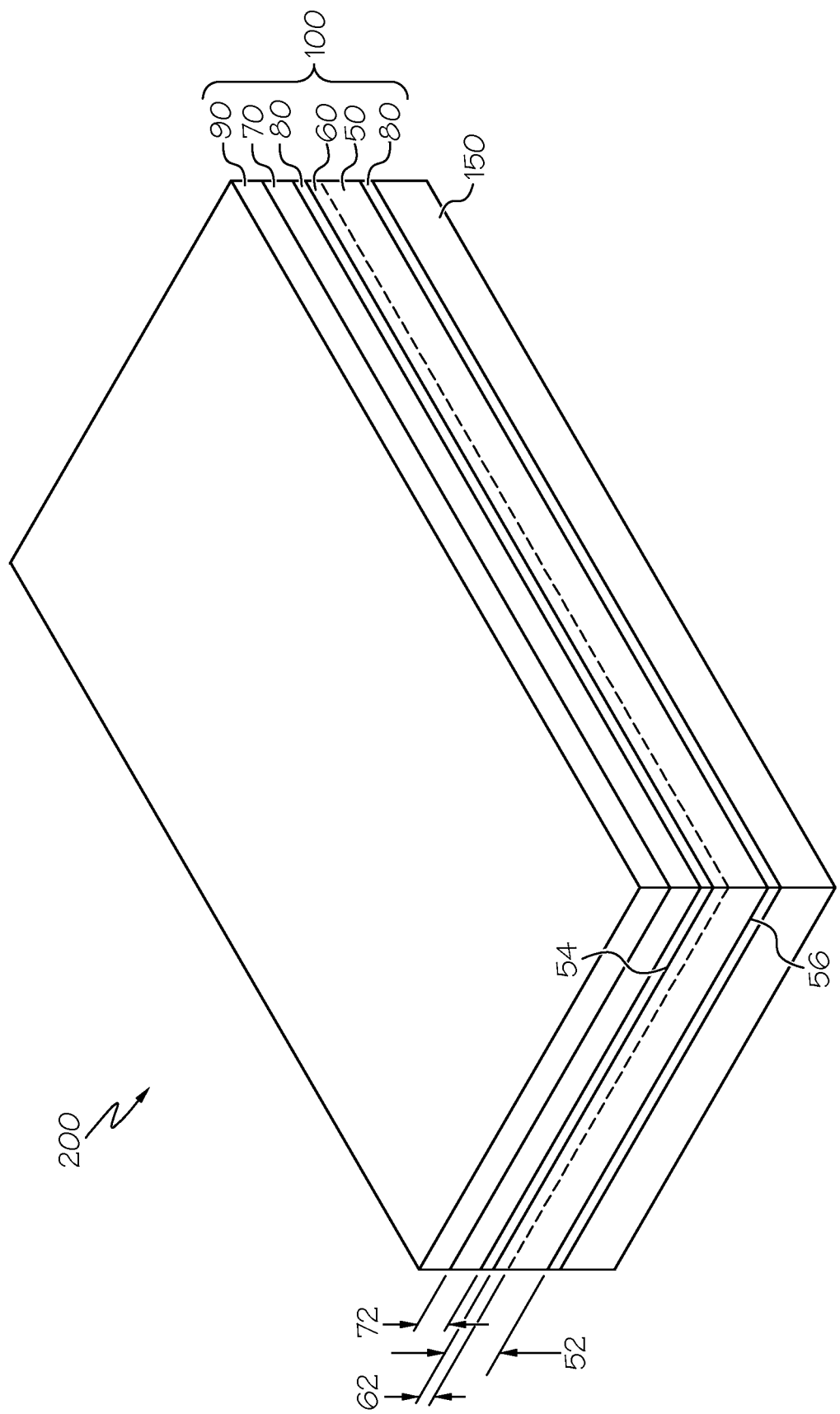
FIG. 3 is a cross-sectional view of a stack assembly including a strengthened glass layer according to some aspects of this disclosure.

In some embodiments, for example in FIGS. 2 and 3, glass element 50 can be fabricated from alkali-free aluminosilicate, borosilicate, boroaluminosilicate, and silicate glass compositions. Glass element 50 can also be fabricated from alkali-containing aluminosilicate, borosilicate, boroaluminosilicate, and silicate glass compositions. In certain embodiments, alkaline earth modifiers can be added to any of the foregoing compositions for glass element 50. In some embodiments, glass compositions according to the following are suitable for the glass element 50: SiO$_2$ at 64 to 69% (by mol %); Al$_2$O$_3$ at 5 to 12%; B$_2$O$_3$ at 8 to 23%; MgO at 0.5 to 2.5%; CaO at 1 to 9%; SrO at 0 to 5%; BaO at 0 to 5%; SnO$_2$ at 0.1 to 0.4%; ZrO$_2$ at 0 to 0.1%; and Na$_2$O at 0 to 1%. In some embodiments, the following composition is suitable for the glass element 50: SiO$_2$ at ~67.4% (by mol %); Al$_2$O$_3$ at ~12.7%; B$_2$O$_3$ at ~3.7%; MgO at ~2.4%; CaO at 0%; SrO at 0%; SnO$_2$ at ~0.1%; and Na$_2$O at ~13.7%. In some embodiments, the following composition is also suitable for the glass element 50: SiO$_2$ at 68.9% (by mol %); Al$_2$O$_3$ at 10.3%; Na$_2$O at 15.2%; MgO at 5.4%; and SnO$_2$ at 0.2%. In some embodiments, a composition for glass element 50 is selected with a relatively low elastic modulus (compared to other alternative glasses). Lower elastic modulus in the glass element 50 can reduce the tensile stress in the element 50 during use, for instance, bending or flexing of an electronic display device. Other criteria can be used to select the composition for glass element 50, including but not limited to, ease of manufacturing to low thickness levels while minimizing the incorporation of flaws, ease of development of a potential compressive stress region to offset tensile stresses generated during bending, optical transparency, and/or corrosion resistance. The use of a glass element 50 as described herein selectively achieves the above criteria.

The glass element 50 can adopt a variety of physical forms and shapes for use in electronic devices. From a cross-sectional perspective, the element 50 and the layer (or layers) can be flat or planar sheet parts. In some embodiments, element 50 can be fabricated in non-rectilinear, sheet-like forms depending on the final application. As an example, a mobile display device having an elliptical display and bezel could include a glass layer having a generally elliptical, sheet-like form.

Still referring to FIGS. 2 and 3, the glass element 50 of the stack assembly 100 further includes a compressive stress region 60 that extends from the first primary surface 54 of the glass element 50 to a first depth 62 in the glass element 50. Among other advantages, the compressive stress region 60 can be employed within the glass element 50 to offset tensile stresses generated in the glass element 50 upon bending, particularly tensile stresses that reach a maximum near the first primary surface 54. The compressive stress region 60, in combination with the multistep method that employs a redraw step and two chemical etching steps, can result in an unexpected improved bend strength that is not achievable with individual thinning methods.

The compressive stress region 60 can include a compressive stress of about 100 MPa or more at the first primary surface of the layer 54. In some aspects, the compressive stress at the first primary surface 54 is from about 500 MPa to about 2000 MPa, for example from about 600 MPa to about 1500 MPa from about 650 MPa to about 1500 MPa, from about 660 MPa to about 1500 MPa, from about 670 MPa to about 1500 MPa, from about 675 MPa to about 1500 MPa, from about 680 MPa to about 1500 MPa, from about 690 MPa to about 1500 MPa, from about 700 MPa to about 1500 MPa, from about 720 MPa to about 1500 MPa, from about 750 MPa to about 1500 MPa, from about 775 MPa to about 1500 MPa, from about 800 MPa to about 1500 MPa, from about 825 MPa to about 1500 MPa, from about 850 MPa to about 1500 MPa, from about 875 MPa to about 1500 MPa, from about 900 MPa to about 1500 MPa, or from about 950 MPa to about 1500 MPa. Compressive stress as used herein (including surface CS) is measured by surface stress meter (FSM) using commercially available instruments such as the FSM-6000, manufactured by Orihara Industrial Co., Ltd. (Japan). Surface stress measurements rely upon the accurate measurement of the stress optical coefficient (SOC), which is related to the birefringence of the glass. SOC in turn is measured according to Procedure C (Glass Disc Method) described in ASTM standard C770-16, entitled "Standard Test Method for Measurement of Glass Stress-Optical Coefficient," the contents of which are incorporated herein by reference in their entirety. In other aspects, the compressive stress can be 1000 MPa or more at the first primary surface 54, up to 2000 MPa, depending on the process employed to produce the compressive stress in the glass element 50. The compressive stress can also range from about 100 MPa to about 600 MPa at the first primary surface 54 in other aspects of this disclosure.

Within the compressive stress region 60, the compressive stress can stay constant, decrease or increase within the glass element 50 as a function of depth from the first primary surface of the glass layer 54 down to the first depth 62. As such, various compressive stress profiles can be employed in compressive stress region 60. Further, the depth 62 can be set at approximately 15 µm or less from the first primary surface 54 of the glass element 50. In other aspects, the depth 62 can be set such that it is approximately ⅓ of the thickness 52 of the glass element 50 or less, or 20% of the thickness 52 of the glass element 50 or less, from the first primary surface 54 of the glass element 50.

In stack assembly 100 the compressive stress region 60 of the glass element 50 can be developed through an ion exchange process as noted above. That is, the compressive stress region 60 can include a plurality of ion-exchangeable metal ions and a plurality of ion-exchanged metal ions, the ion-exchanged metal ions selected so as to produce compressive stress in the region 60. In some aspects of stack assembly 100, the ion-exchanged metal ions have an atomic radius larger than the atomic radius of the ion-exchangeable metal ions. The ion-exchangeable ions (e.g., $Na^+$ ions) are present in the glass element 50 before being subjected to the ion exchange process. Ion-exchanging ions (e.g., $K^+$ ions) can be incorporated into the glass element 50, replacing some of the ion-exchangeable ions. The incorporation of ion-exchanging ions, for example, $K^+$ ions, into the glass element 50 can be effected by submersing the element or the layer in a molten salt bath containing ion-exchanging ions (e.g., molten $KNO_3$ salt). In this example, the $K^+$ ions have a larger atomic radius than the $Na^+$ ions and tend to generate local compressive stresses in the glass wherever present. In other aspects of the method, the submersing step includes submersing the glass element 50 in the strengthening bath at about 400° C. to about 480° C. for about 15 minutes to about 180 minutes to develop the compressive stress region 60. In some embodiments there may be, in addition or in the alternative, a compressive stress region extending from the second primary surface 56 to a depth within the thickness of the glass element 50. Accordingly, the center of curvature when the stack assembly 100 is folded may be on either the side of the first surface 54 (in which case at least second surface 56 has a compressive layer), the side of the second surface 56 (in which case at least first surface 54 has a compressive layer), or on both (in which case both the first and second surfaces 54, 56, have compressive layers) when multiple folds are present.

In some aspects, a post-ion exchange process to remove material from the surface of the glass element 50 can provide a benefit in terms of flaw size reduction. In particular, such a removing process can employ a second chemical etching step to remove about 1 µm to about 5 µm from the final thickness of the glass element 52 at the first primary surface 54 after formation of the compressive stress region 60. For example, the removing step can employ a 950 ppm $F^-$ ion (e.g., an HF acid), 0.1M citric acid etching solution for ~128 minutes for this purpose. A reduction in the maximum flaw size in the glass layer and/or the glass element 50, particularly near their surfaces, can serve to reduce the stress intensity factor produced from bending the layer and/or the element.

According to some aspects, the removing process can be conducted to control the flaw distribution in the compressive stress regions 60 to a maximum flaw size of 5 µm or less at the first primary surface 54 of the glass element 50. The removing step can also be conducted such that the compressive stress regions 60 have a maximum flaw size of 2.5 µm or less, or even as low as 0.4 µm or less, at the first primary surface 54 of the glass element 50. The maximum flaw size can also be held to 2.5 µm or less, 2.4 µm or less, 2.3 µm or less, 2.2 µm or less, 2.1 µm or less, 2 µm or less, 1.9 µm or less, 1.8 µm or less, 1.75 µm or less, 1.7 µm or less, 1.6 µm or less, 1.5 µm or less, 1.4 µm or less, 1.3 µm or less, 1.2 µm or less, 1.1 µm or less, 1 µm or less, 0.9 µm or less, 0.8 µm or less, 0.75 µm or less, 0.6 µm or less, 0.5 µm or less, 0.4 µm or less, or even smaller flaw size ranges. Reducing the flaw size in the compressive stress region of the glass element 50 can further reduce the propensity of these elements and/or layers to fail by crack propagation upon the application of tensile stresses by, for example, bending forces. In addition, some aspects of stack assembly 100 can include a surface region with a controlled flaw size distribution (e.g., flaw sizes of 0.5 µm or less at the first primary surface 54 of the glass layer 50) that also lacks the superposition of a compressive stress region. According to some additional aspects of the method, the removing step can also be conducted to control the flaw size distribution within a region of the glass element 50 that lacks the superposition of a compressive stress region 60. Further, variants of the removing process can be conducted at the edges of the glass element 50 to control the flaw size distribution at the edges.

Referring to FIGS. 2 and 3, the glass element 50 can be characterized by an absence of failure when the element is held at a specified bend radius from about 3 mm to about 20 mm for 60 minutes or more at about 25° C. and about 50% relative humidity. As used herein, the terms "fail," "failure" and the like refer to breakage, destruction, delamination, crack propagation or other mechanisms that leave the stack assemblies, glass articles, and glass elements of this disclosure unsuitable for their intended purpose. When the glass element 50 is held at the bend radius under these conditions, bending forces (e.g., pulling downward) are applied to the ends of the element 50. In general, tensile stresses are generated at the first primary surface 54 of the element 50 and compressive stresses are generated at the second primary surface 56 during the application of bending forces. In other aspects, glass element 50 can be configured to avoid failure for bend radii that range from about 3 mm to about 10 mm. In some aspects, the bend radius can be set in a range from about 1 mm to about 5 mm. The bend radius can also be set to a range from about 5 mm to 7 mm without causing a failure in the glass element 50 according to other aspects of stack assembly 100. The glass element 50 can be also characterized in some aspects by an absence of failure when the element is held at a bend radius from about 3 mm to about 10 mm for 120 hours or more at about 25° C. and about 50% relative humidity. Bend testing results can vary under testing conditions with temperatures and/or humidity levels that differ from the foregoing. For example, a glass element 50 having a smaller bend radii (e.g., <3 mm) may be characterized by an absence of failure in bend testing conducted at humidity levels significantly below 50% relative humidity.

Referring again to FIG. 2, the electronic device assembly 200 and the cover element 100 include a polymeric layer 70 having thickness 72. In the configuration shown, the polymeric layer 70 is disposed over the first primary surface 54 of the glass element 50. For example, the polymeric layer 70 can be disposed directly on and in contact with the first primary surface 54 of the glass element in some embodiments. Direct contact of the glass element 50 and second layer 70 can include the entire facing surfaces of both layers being in uniform contact with one another. In other embodiments, the contact between the glass element 50 and second layer 70 can include less than the entire facing surfaces of both layers.

In other embodiments, as depicted in exemplary form in FIG. 2, the polymeric layer 70 can be adhered to the glass element 50 with an adhesive 80. The adhesive 80 can be uniformly applied and in contact with the entire surface of both the glass element 50 and the polymeric 70 layer. In other embodiments, the contact between the glass element 50 and second layer 70 can include less than the entire facing surfaces of both layers.

The thickness 72 of the polymeric layer 70 can be set at about 1 micrometer to about 200 μm or less in some embodiments. In other embodiments, the thickness 72 of the polymeric layer 70 can be set from about 10 μm to about 100 μm, or from about 10 μm to about 200 μm, or from about 15 μm to about 175 μm, or from about 20 μm to about 150 μm, or from about 25 μm to about 150 μm, or from about 20 μm to about 100 μm, or from about 30 μm to about 90 μm, or from about 40 μm to about 80 μm, or from about 50 μm to about 90 μm, or from about 75 μm to about 125 μm, or from about 50 μm to about 125 μm, or from about 50 μm to about 100 μm. As is also evident to those with ordinary skill, the thickness 72 of the polymeric layer 70 can be configured to be from any level from about 1 μm to about 200 μm, and all ranges and sub-ranges between the foregoing values.

According to some embodiments, the polymeric layer 70 can have a low coefficient of friction. In these configurations, the polymeric layer 70 is disposed on the first primary surface 54 of the glass element 50. When employed in the cover elements and electronic devices of the present disclosure, the polymeric layer 70 can function to reduce friction and/or reduce surface damage from abrasion. The polymeric layer 70 can also provide a measure of safety in retaining pieces and shards of glass element 50 when the element and/or layer has been subjected to stresses in excess of its design limitations that cause failure. The thickness 72 of the polymeric layer 70 can be set at 1 micrometer or less in some aspects. In other aspects, the thickness 72 of the polymeric layer 70 can be set at 500 nm or less, or as low as 10 nm or less for certain compositions. Further, in some aspects of the electronic device assembly 200 and the cover element 100, the polymeric layer 70 can be employed on the primary surface 56 to provide a safety benefit in retaining shards of glass element 50 and/or layer that have resulted from stresses in excess of their design conditions. The polymeric layer 70 on the primary surface 56 may also provide to the cover element 100 an increased resistance to puncture. Not wishing to be bound by theory, the polymeric layer 70 may have energy absorbing and/or dissipating and/or distributing characteristics that allow the cover element 100 to take a load that it would otherwise not be able to withstand without the polymeric layer 70. The load may be either static or dynamic, and may be applied on the side of the cover element 100 having the polymeric layer 70.

As deployed in an electronic device assembly 200 and the cover element 100 depicted in FIG. 2, the polymeric layer 70, according to some embodiments, can provide a measure of safety in retaining pieces and shards of the glass element 50 in the event that the element and/or layer has been subjected to stresses in excess of its design limitations that cause failure, as configured within the device assembly 200 and cover element 100. Further, in some embodiments of the electronic device assembly 200 and cover element 100, an additional polymeric layer 70 (not shown) can be employed on the second primary surface 56 of the glass element 50 to provide an additional safety benefit in retaining shards of glass element 50 (i.e., as located on or in proximity to the second primary surface 56) that have resulted from stresses in excess of their design conditions.

The presence of the polymeric layer 70 in the cover element 100 can ensure that objects and other instrumentalities that might otherwise directly impact the glass element 50 are impacted against the polymeric layer 70. This can provide a benefit in terms of reducing the likelihood of the development of impact-related flaws, defects and the like in the glass element 50 that might otherwise reduce its strength in static and/or cyclic bending. Still further, the presence of the polymeric layer 70 also can serve to spread a stress field from an impact over a larger area of the underlying glass element 50 and any electronic device substrate 150, if present. In some embodiments, the presence of the polymeric layer 70 can reduce the likelihood of damage to electronic components, display features, pixels and the like contained within an electronic device substrate 150.

According to some embodiments, the polymeric layer 70 can employ any of a variety of energy-resistant polymeric materials. In some embodiments, the polymeric layer 70 is selected with a polymeric composition having a high optical transmissivity, particularly when the electronic device assembly 200 or the cover element 100 including the layer 70 is employed in a display device or related application. According to some embodiments, the polymeric layer 70 comprises a polyimide ("PI"), a polyethylene terephthalate ("PET"), a polycarbonate ("PC") or a poly methyl methacrylate ("PMMA"). The layer 70, in some embodiments, can also be coupled to the glass element 50 by an adhesive 80 (e.g., OCA), as shown in FIGS. 2 and 3.

Second layer 70 can employ various fluorocarbon materials that have low surface energy, including thermoplastics for example, polytetrafluoroethylene ("PTFE"), fluorinated ethylene propylene ("FEP"), polyvinylidene fluoride ("PVDF"), and amorphous fluorocarbons (e.g., DuPont® Teflon® AF and Asahi® Cytop® coatings) which typically rely on mechanical interlocking mechanisms for adhesion. Second layer 70 can also be fabricated from silane-containing preparation for example, Dow Corning® 2634 coating or other fluoro- or perfluorosilanes (e.g., alkylsilanes) which can be deposited as a monolayer or a multilayer. In some aspects, second layer 70 can include silicone resins, waxes, polyethylene (oxided) used by themselves or in conjunction with a hot-end coating for example, tin oxide, or vapor-deposited coatings for example, parylene and diamond-like coatings ("DLCs"). Second layer 70 can also include zinc oxide, molybdenum disulfide, tungsten disulfide, hexagonal boron nitride, or aluminum magnesium boride that can be used either alone or as an additive in the foregoing coating compositions and preparations.

Still further, the polymeric layer 70 may be applied directly to the glass element 50 (as when the material of layer 70 is applied as a liquid, for example), may be placed atop the glass element 50 (as when the material of layer 70 is in the form of a sheet or film, for example), or may be bound to the glass element 50 (e.g., a glass layer) using an adhesive (e.g., adhesive 80), for example. When present, the adhesive 80, for example, as a single layer, may be optically clear, pressure sensitive, or combinations thereof. The adhesive layer 80 can be in direct and uniform contact with both the glass element 50 and second layer 70.

Alternatively or in addition to the above, the polymeric layer 70 may include various other attributes, for example anti-microbial, anti-splinter, anti-smudge, and anti-fingerprint characteristics. Moreover, the polymeric layer 70 may be made of more than one layer, or may be made of different materials within one layer, so as to provide a variety of functions for the electronic device assembly 200 or the cover element 100, as the case may be.

According to some embodiments, as shown in FIG. 3, the electronic device assembly 200 and the cover element 100 depicted in FIG. 2 may include a scratch-resistant coating 90 disposed over the polymeric layer 70. The coating 90 can be configured with a thickness 92, set to 1 μm or less in some embodiments. In other embodiments, the thickness 92 of the coating 90 can be set at 500 nm or less, or as low as 10 nm or less, and all ranges and sub-ranges between the foregoing values, for certain compositions of the coating 90. In other embodiments, the coating 90 has a thickness 92 that ranges from about 1 μm to about 100 μm, including all thickness levels between these bounds. More generally, the scratch-resistant coating 90 can serve to provide additional scratch-resistance (e.g., as manifested in increased pencil hardness as tested according to ASTM Test Method D3363 with a load of 750 g or more) for the foldable electronic device assembly 200 and cover element 100 employing it. Moreover, the scratch-resistant coating 90 can also enhance the impact resistance of the foldable electronic device assembly 200 and the cover element 100. The added scratch resistance (and additional impact resistance in some embodiments) can be advantageous for the device assembly 200 and the cover element 100 to ensure that the significant gains in puncture and impact resistance afforded by the polymeric layer 70 are not offset by reduced scratch resistance (e.g., as compared to a device assembly and/or cover element that would otherwise lack the polymeric layer 70).

In some embodiments, the scratch-resistant coating 90 can comprise a silane-containing preparation for example, Dow Corning® 2634 coating or other fluoro- or perfluorosilanes (e.g., alkylsilanes) which can be deposited as a monolayer or a multilayer. Such silane-containing formulations, as used herein, can also be referred to as a hard coating ("HC"), while recognizing that other formulations, as understood in the field of the disclosure, can also constitute a hard coating. In some embodiments, the scratch-resistant coating 90 can include silicone resins, waxes, polyethylene (oxidized), a PET, a polycarbonate (PC), a PC with an HC component, a PI, and a PI with an HC component, or adhesive tape (for example, 3M® code 471 adhesive tape), used by themselves or in conjunction with a hot-end coating for example, tin oxide, or vapor-deposited coatings for example, parylene and diamond-like coatings ("DLCs").

Still further, the scratch-resistant coating 90 may also include a surface layer with other functional properties, including, for example, additional fluorocarbon materials that have low surface energy, including thermoplastics for example, polytetrafluoroethylene ("PTFE"), fluorinated ethylene propylene ("FEP"), polyvinylidene fluoride ("PVDF"), and amorphous fluorocarbons (e.g., DuPont® Teflon® AF and Asahi® Cytop® coatings) which typically rely on mechanical interlocking mechanisms for adhesion. In some additional embodiments, the scratch-resistant coating 90 can include zinc oxide, molybdenum disulfide, tungsten disulfide, hexagonal boron nitride, or aluminum magnesium boride that can be used either alone or as an additive in the foregoing coating compositions and preparations.

In certain embodiments of the electronic device assembly 200 and the cover element 100 depicted in FIG. 3, the scratch-resistant coating 90 has a pencil hardness of 5H or more (as measured according to ASTM Test Method D3363 with a load of 750 g or more). According to some embodiments, the scratch-resistant coating 90 can exhibit a pencil hardness of 6H, 7H, 8H, 9H or more, and all values between these hardness levels as measured according to ASTM Test Method D3363.

According to certain embodiments of the electronic device assembly 200 and the cover element 100 depicted in FIGS. 2 and 3, one or more adhesives 80 may be employed between the polymeric layer 70 and the glass element 50, and/or between the electronic device substrate 150 and the glass element 50. In some embodiments, the adhesives 80 are uniformly applied to the entire surface and in direct contact with both surfaces of glass element 50, polymeric layer 70 and/or substrate 150. In other embodiments, the adhesives 80 are applied over less than the entire surface of glass element 50 and/or polymeric layer 70. Such adhesives can generally range in thickness from about 1 μm to 100 μm, in some embodiments. In other embodiments, the thickness of each adhesive 80 can range from about 10 μm to about 90 μm, from about 20 μm to about 60 μm, or, in some cases, any of the thickness values from 1 μm to 100 μm, and all ranges and sub-ranges between the foregoing values. In some embodiments, particularly for an electronic device assembly 200 and cover element 100 configured for a display-type application, the adhesives 80 are substantially transmissive, for example optically clear adhesives ("OCA"), as understood by those with skill in the field of the disclosure.

In yet some other implementations, a foldable electronic device 200 with a foldable feature can include the stack assembly 100. The foldable feature, for example, can be a display, printed circuit board, housing or other features associated with the electronic device. When the foldable feature is a display, for example, the stack assembly 100 can be substantially transparent. Further, the stack assembly 100 can have bend radius capabilities as described in the foregoing. In some embodiments, the foldable electronic device is a wearable electronic device, for example a watch, wallet or bracelet, that includes or otherwise incorporates the stack assembly 100 described according to the foregoing. As defined herein, "foldable" includes complete folding, partial folding, bending, flexing, and multiple-fold capabilities.

The stack assemblies 100 depicted in FIGS. 2 and 3 can be fabricated according to a method that includes the steps: forming a first glass element 50, for example a first glass layer, having a first primary surface 54, a compressive stress region 60 extending from the first primary surface 54 of the glass element 50 to a first depth 62 in the element 50, and a final thickness 52. As it relates to the stack assembly 100, the compressive stress region 60 is defined by a compressive stress of about 100 MPa or more at the first primary surface 54 of the element 50.

The method for forming stack assemblies 100 depicted in FIGS. 2 and 3 can also include the step of forming a glass element 50 having a thickness 52 from about 20 μm to about 125 μm. Here, the element 50 further comprises a glass layer, a first primary surface 54, and a second primary surface 56. In these aspects, the glass element 50 can also comprise: (a) an absence of failure when the element 50 (e.g., a glass layer) is held at a bend radius from about 3 mm to about 20 mm for about 60 minutes or more at about 25° C. and about 50% relative humidity. In other aspects of the method, glass element 50 can be configured to avoid failure for bend radii that range from about 3 mm to about 10 mm. In some aspects, the bend radius can be set in a range from about 1 mm to about 5 mm. The bend radius can also be set to a range from about 5 mm to 7 mm without causing a failure in the glass element 50 according to other aspects of the method.

In an exemplary embodiment, the steps of forming the glass element 50 (e.g., a first glass layer) can include a step of forming an interim thickness (e.g., about 200 µm) that exceeds the final thickness 52 of the glass element 50 using a redrawing glass forming process that maintains the pristine surface characteristics of the glass. The interim glass element 50 can then be separated, cut and/or otherwise shaped into near-final part dimensions using cutting processes (e.g., water cutting, laser cutting, etc.). At this point, the interim glass element 50 can then be etched (i.e. a first chemical etching step) to a near final thickness 52 (e.g., about 50 or 75 µm, or any of the thicknesses mentioned above) according to the foregoing process steps. Etching to a near final thickness at this stage in the process can provide a benefit in removing flaws and other defects introduced from the prior glass forming and separation and/or cutting steps. Next, the glass element 50 can be subjected to process steps for forming the compressive stress region 60 including but not limited to the foregoing ion exchange process. A final, light etch (i.e. a second chemical etching step) can then be performed on the glass element 50 containing the compressive stress region 60 according to the prior-described process. This final, light etch can then remove any appreciable flaws and defects in the surface of the glass element 50 that resulted from the prior ion exchange process. The glass element 50 produced according to the method can comprise: (a) an absence of failure when the element 50 or layer is held at a bend radius from about 3 mm to about 20 mm for about 60 minutes or more at about 25° C. and about 50% relative humidity.

Figure 5A:
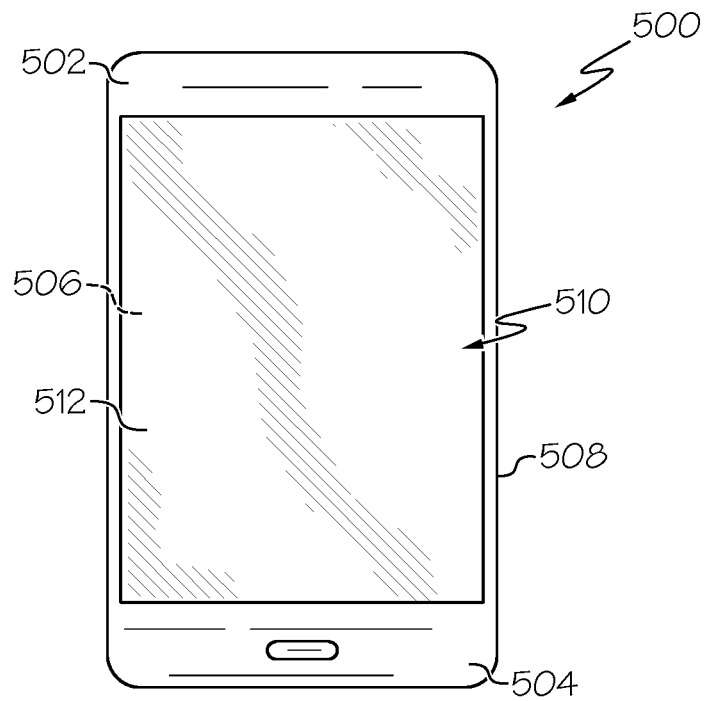
FIG. 5A is a plan view of an exemplary electronic device incorporating any of the strengthened articles disclosed herein.
Figure 5B:
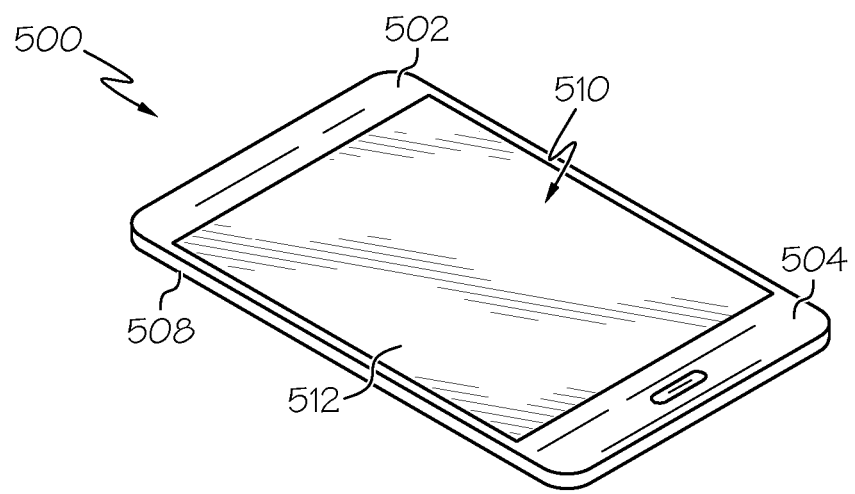
FIG. 5B is a perspective view of the exemplary electronic device of FIG. 5A.

The glass elements disclosed herein may be incorporated into another article such as an article with a display (or display articles) (e.g., consumer electronics, including mobile phones, tablets, computers, navigation systems, wearable devices (e.g., watches) and the like), architectural articles, transportation articles (e.g., automotive, trains, aircraft, sea craft, etc.), appliance articles, or any article that may benefit some transparency, scratch-resistance, abrasion resistance or a combination thereof. An exemplary article incorporating any of the glass elements disclosed herein is shown in FIGS. 5A and 5B. Specifically, FIGS. 5A and 5B show a consumer electronic device 500 including a housing 502 having front 504, back 506, and side surfaces 508; electrical components (not shown) that are at least partially inside or entirely within the housing and including at least a controller, a memory, and a display 510 at or adjacent to the front surface of the housing; and a cover substrate 512 at or over the front surface of the housing such that it is over the display. In some embodiments, at least one of the cover substrate 512 or a portion of housing 102 may include any of the glass elements disclosed herein.

In order to promote a further understanding, the following examples are provided. These examples are shown by way of illustration and not limitation.

EXAMPLES

Figure 4:
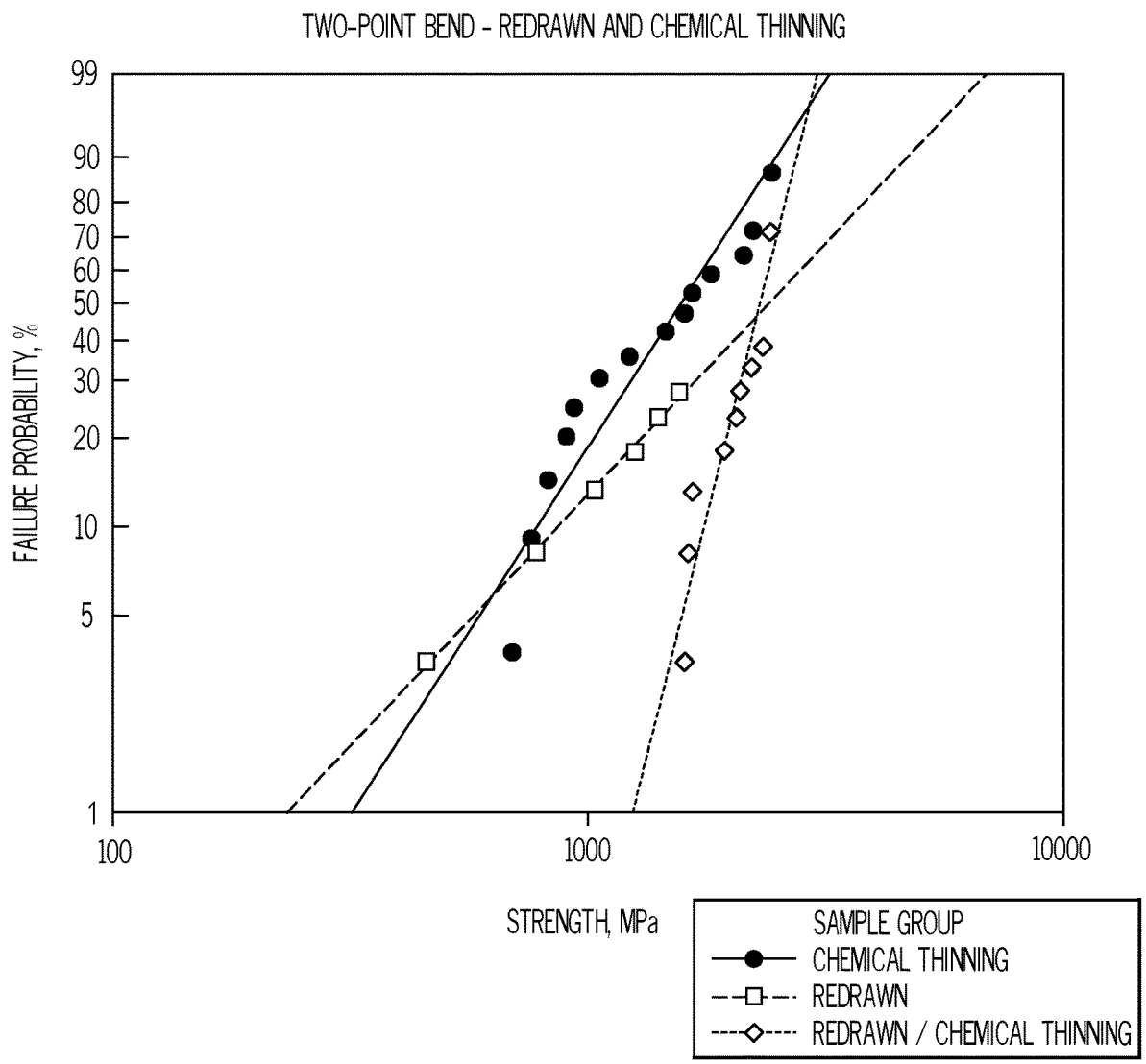
FIG. 4 is a Weibull plot of failure probability vs. strength under two point bending of various different glass samples according to some aspects of the present disclosure.

As demonstrated by the results depicted in FIG. 4, the improved bend strength and glass element thickness can be correlated for the present disclosure of a cover element. The results in FIG. 4 were generated by measuring the bend strength of various redrawn, chemical etched, and redrawn and chemical etched glass samples having thicknesses of 50 µm. The combination of redraw and chemical etching processes in a multi-step method for forming a glass element is evidenced to result in improved strength and decreased flaw distribution as compared to either individual process.

According to some aspects, 75 µm thick glass samples with a composition consistent with Corning® Gorilla Glass® 2.0 were subjected to an ion exchange process that included a $KNO_3$ bath submersion at 430° C. for 30 minutes. Compressive stress (MPa) as a function of glass layer depth (µm) was then measured and the results were a compressive stress of about 889 MPa at the surface of the glass and appreciable compressive stress levels were measured to a depth of about 11.4 µm (i.e., DOL=11.4 µm). As used herein, depth of compression (DOC) means the depth at which the stress in the chemically strengthened alkali aluminosilicate glass article described herein changes from compressive to tensile. DOC may be measured by FSM or a scattered light polariscope (SCALP) depending on the ion exchange treatment. Where the stress in the glass article is generated by exchanging potassium ions into the glass article, FSM is used to measure DOC. Where the stress is generated by exchanging sodium ions into the glass article, SCALP is used to measure DOC. Where the stress in the glass article is generated by exchanging both potassium and sodium ions into the glass, the DOC is measured by SCALP, since it is believed the exchange depth of sodium indicates the DOC and the exchange depth of potassium ions indicates a change in the magnitude of the compressive stress (but not the change in stress from compressive to tensile); the exchange depth of potassium ions (DOL of potassium ions) in such glass articles is measured by FSM.

A tested chemically thinned glass sample was prepared by a first etching step. A 200 µm-thick fusion draw glass with a composition consistent with Corning® Gorilla Glass® 2.0 was thinned to a thickness of about 50 µm using a two-step etching process. In a horizontal etch process, a first etchant solution, at 27° C., was sprayed onto the top and bottom surfaces of the glass sample to remove about 80 µm of glass material to result in a 120 µm-thick glass sample. The first etchant solution was 12.5% HF, 6.5% $HNO_3$, and 81% deionized water (DI). In a second pass, the same etchant solution was sprayed onto the top and bottom surfaces of the glass sample to remove about 70 µm of glass material to result in a about 50 µm-thick glass sample. The glass sample was washed with DI water to remove any etchant residue and then dried.

The chemically thinned glass sample was then loaded into a stainless steel fixture and the sample and fixture were heated to 360° C. over a period 60 minutes. The fixture and sample were then lowered into a 410° C. potassium nitrate salt (with 0.5% silicic acid) for about 20 minutes before beginning removed and cooled from 410° C. to 60° C. over a period of 60 minutes. The glass sample in the fixture was then soaked in DI water until the residual salt is removed and the sample was then extracted from the fixture. Compressive stress (MPa) as a function of glass layer depth (µm) was then measured and the results were a compressive stress of about 890 MPa at the surface of the glass and appreciable compressive stress levels were measured to a depth of about 10.8 µm.

In a second chemical etching step, an etchant solution, at 27° C., was sprayed onto the top and bottom surfaces of the glass sample to remove about 1 µm of glass material to result in an about 50 µm-thick glass sample. The etchant solution was 2% HF, 5% $HNO_3$, and 93% deionized water (DI). The glass sample was washed with DI water to remove any etchant residue and then dried.

A tested redrawn glass sample was prepared by redrawing a 200 µm-thick fusion drawn glass with a composition consistent with Corning® Gorilla Glass® 2.0 to thin the glass to about a 50 µm thickness level. A redrawn process as disclosed in WO 2017/095791, herein incorporated in its entirety, was carried out to thin a fusion drawn glass preform to produce the draw thinned glass samples. Particularly, a fusion drawn glass preform is heated to reach a glass viscosity value in the range of $10^5$ to $10^7$ poise prior to redrawing the preform to the specific target thickness which is controlled by adjusting the mass balance of the redraw process. The fusion drawn preform is fed at a rate of from 3 to 100 mm per minute at a pull speed from 50 to 1000 mm per minute to arrive at the target thickness. Redrawn glass was cooled at a rate to match the expansion curve of the preform glass through a setting zone to arrive at a viscosity in the range of $10^9$ to $10^{15}$ poise. The thinned glass was singulated into glass samples and edge finished for further processing.

The redrawn glass sample was then loaded into a stainless steel fixture and the sample and fixture were heated to 360° C. over a period 60 minutes. The fixture and sample were then lowered into a 410° C. potassium nitrate salt (with 0.5% silicic acid) for about 20 minutes before beginning removed and cooled from 410° C. to 60° C. over a period of 60 minutes. The glass sample in the fixture was then soaked in DI water until the residual salt is removed and the sample was then extracted from the fixture. Compressive stress (MPa) as a function of glass layer depth (µm) is about 905 MPa at the surface of the glass and appreciable compressive stress levels is at a depth of about 8.4 µm.

In a subsequent chemical etching step, an etchant solution, at 27° C., was sprayed onto the top and bottom surfaces of the redrawn glass sample to remove about 1 µm of glass material to result in an about 50 µm-thick glass sample. The etchant solution was 2% HF, 5% $HNO_3$, and 93% deionized water (DI). The redrawn glass sample was washed with DI water to remove any etchant residue and then dried.

In another tested sample, the above chemical thinning process and redraw process were combined. A 1100 µm-thick fusion drawn glass with a composition consistent with Corning® Gorilla Glass® 2.0 was first redrawn to thin the glass to about a 200 µm thickness level. A redrawn process as disclosed in WO 2017/095791, herein incorporated in its entirety, was carried out to thin a fusion drawn glass preform to produce the draw thinned glass samples. Particularly, a fusion drawn glass preform is heated to reach a glass viscosity value in the range of $10^5$ to $10^7$ poise prior to redrawing the preform to the specific target thickness which is controlled by adjusting the mass balance of the redraw process. The fusion drawn preform is fed at a rate of from 3 to 100 mm per minute at a pull speed from 50 to 1000 mm per minute to arrive at the target thickness. Redrawn glass was cooled at a rate to match the expansion curve of the preform glass through a setting zone to arrive at a viscosity in the range of $10^9$ to $10^{15}$ poise. The thinned glass was singulated into glass samples that were edge finished for further processing.

In a first chemical etching step, the redrawn glass sample was thinned to a thickness of about 50 µm using a two-step etching process. In a horizontal etch process, a first etchant solution, at 27° C., was sprayed onto the top and bottom surfaces of the glass sample to remove about 80 µm of glass material to result in a 120 µm-thick glass sample. The first etchant solution was 12.5% HF, 6.5% $HNO_3$, and 81% deionized water (DI). In a second pass, the same etchant solution was sprayed onto the top and bottom surfaces of the glass sample to remove about 70 µm of glass material to result in a about 50 µm-thick glass sample. The glass sample was washed with DI water to remove any etchant residue and then dried.

The redrawn and chemically thinned glass sample was then loaded into a stainless steel fixture and the sample and fixture were heated to 360° C. over a period 60 minutes. The fixture and sample were then lowered into a 410° C. potassium nitrate salt (with 0.5% silicic acid) for about 20 minutes before beginning removed and cooled from 410° C. to 60° C. over a period of 60 minutes. The glass sample in the fixture was then soaked in DI water until the residual salt is removed and the sample was then extracted from the fixture. Compressive stress (MPa) as a function of glass layer depth (µm) is about 905 MPa at the surface of the glass and appreciable compressive stress levels is at a depth of about 8.4 µm.

In a second chemical etching step, an etchant solution, at 27° C., was sprayed onto the top and bottom surfaces of the glass sample to remove about 1 µm of glass material to result in an about 50 µm-thick glass sample. The etchant solution was 2% HF, 5% $HNO_3$, and 93% deionized water (DI). The glass sample was washed with DI water to remove any etchant residue and then dried.

The benefit of combining a redraw method with a multi-step chemical etching method and an IOX strengthening step to form a thin glass element is shown in FIG. 4, which shows various two point bend strength distributions for the tested glass samples discussed above. The two point bend values in these figures were measured by testing the samples as follows. The samples were stressed at a constant rate of 250 MPa/sec. For the two point bending protocol, see S. T. Gulati, J. Westbrook, S. Carley, H. Vepakomma, and T. Ono, "45.2: Two point bending of thin glass substrates," in SID Conf, 2011, pp. 652-654. The environment was controlled at 50% relative humidity and 25° C. The data sets show the maximum stress at failure, and assume that the failure occurs at the minimum radius (2 mm) location. The line marked by solid circle points (●) shows a Weibull distribution for strength of a glass sample that was prepared and thinned by chemical thinning. The line marked by open square points (□) shows a Weibull distribution for strength of a glass sample that was prepared and thinned by a redraw method. The line marked by open diamond points (◇) shows a Weibull distribution for strength of a glass sample that was prepared and thinned by combining chemical thinning and redraw methods.

This set of samples show a strength of about 1850 MPa or more at a 10% failure probability, about 1600 MPa or more at a 5% failure probability, and about 1250 MPa or more at a 1% failure probability for the glass sample prepared by combining chemical thinning and redraw methods. In comparison, the data shows a strength of about 775 MPa at a 10% failure probability, about 600 MPa at a 5% failure probability, and about 250 MPa at a 1% failure probability for the glass sample prepared by chemical thinning. The method of combining chemical thinning and redrawing a glass material led to an increase in bend strength as compared to the method of only utilizing chemical thinning, for example, an increase of about 139% at a 10% failure probability, about 167% at a 5% failure probability, and about 400% at a 1% failure probability. In a further comparison, the data shows a strength of about 825 MPa at a 10% failure probability, about 600 MPa at a 5% failure probability, and about 200 MPa at a 1% failure probability for the glass sample prepared by a redrawn method. The method of combining chemical thinning and redrawing a glass material led to an increase in bend strength as compared to the method of only utilizing redraw for thinning, for example, an increase of about 124% at a 10% failure probability, about 167% at a 5% failure probability, and about 525% at a 1% failure probability.

Not wishing to be bound by theory, it appears that combining the chemical thinning and redraw methods to thin a glass material increases bend strength by utilizing the pristine surface quality of the redraw glass and removing or reducing flaws by a certain degree of chemical thinning that also retains the surface and edge strength of the glass material. It is believed that the light etch after IOX reduces flaw depth and blunts crack tips introduced by the IOX process itself and, thus, increases the strength of the samples in addition to the desired thinning method.

Many variations and modifications may be made to the above-described embodiments of the disclosure without departing substantially from the spirit and various principles of the disclosure. All such modifications and variations are intended to be included herein within the scope of this disclosure and protected by the following claims.

For example, although in some embodiments, the cover element was described as being used as a typical "cover glass" for a display, the cover element may be used on any portion of a device housing, and in some embodiments need not be transparent (as where the cover element is not used in a location where one would view objects there through).

What is claimed is:

1. A glass-based element comprising a bend strength of from about 1000 MPa to about 1800 MPa at a failure probability of 1% and an average thickness of less than 75 microns.

2. The glass-based element of claim 1, wherein the average thickness is from about 20 to about 60 microns.

3. The glass-based element of claim 2, wherein the bend strength is greater than about 1100 MPa at a failure probability of 1%.

4. The glass-based element of claim 1, wherein the glass composition comprises an alkali metal.

5. The glass-based element of claim 4, wherein the alkali metal comprises lithium or sodium.

6. The glass-based element of claim 1, wherein the glass-based element comprises a bend strength greater than about 1400 MPa at a failure probability of 5%.

7. A consumer electronic product, comprising:
   a housing comprising a front surface, a back surface and side surfaces;
   electrical components at least partially within the housing, the electrical components comprising at least a controller, a memory, and a display, the display at or adjacent the front surface of the housing; and
   a cover substrate disposed over the display,
   wherein at least one of a portion of the housing or the cover substrate comprises the glass-based element of claim 1.

8. A method of making a glass-based element, comprising the steps of:
   redrawing a preform glass sheet to form a redrawn glass sheet;
   cutting the redrawn glass sheet to obtain a redrawn glass part, the redrawn glass part comprising a first surface and a second surface;
   in a first chemical etching step, contacting the first and/or second redrawn glass part surfaces with a first etchant to form a chemically etched redrawn glass part;
   subjecting the chemically etched redrawn glass part to an ion exchange step to form an ion-exchanged redrawn glass part, the ion-exchanged redrawn glass part comprising a compressive stress region, a first surface and a second surface, the compressive stress region extending from the first surface of the ion-exchanged redrawn glass part to a first depth in the ion-exchanged redrawn glass part; and
   in a second chemical etching step, contacting the first and/or second ion-exchanged redrawn glass part surfaces with a second etchant to form a glass-based element,
   wherein the glass-based element comprises a bend strength of from about 1000 MPa to about 1800 MPa at a failure probability of 1% and an average thickness of less than 75 microns.

9. The method according to claim 8, wherein the preform glass sheet is fed into a redraw furnace and heated to a viscosity from about $10^5$ to about $10^7$ poise and drawn to a final average thickness of from about 25 to about 200 microns.

10. The method according to claim 8, further comprising a step of edge finishing the redrawn glass part prior to the first chemical etching step.

11. The method according to claim 8, wherein the first etchant comprises a first acid and the second etchant comprises a second acid, and wherein the concentration of the first acid in the first etchant is greater than the concentration of the second acid in the second etchant.

12. The method according to claim 8, wherein the preform glass sheet comprises an average thickness of from about 250 microns to about 1,300 microns; the redrawn glass sheet comprises an average thickness of from about 75 to about 200 microns; the chemically etched redrawn glass part comprises an average thickness of from about 25 to about 125 microns; and the average thickness of the glass-based element is from about 20 to less than 75 microns.

13. The method according to claim 8, wherein the second etchant removes less than 2 microns of thickness from each of the first and/or second ion-exchanged redrawn glass part surfaces.

14. The method according to claim 8, wherein the second chemical etching step removes less than 3 microns of total thickness from the ion-exchanged redrawn glass part.

15. The method according to claim 8, wherein the average thickness of the glass-based element is from about 80% to about 95% thinner than the average thickness of the preform glass sheet.

16. The method according to claim 15, wherein the redrawn glass part is thinned by about 30% to about 80% during the first chemical etching step.

17. The method according to claim 16, wherein the ion-exchanged redrawn glass part is thinned by about 4% to about 12% during the second chemical etching step.

18. The method according to claim 10, wherein the preform glass sheet is thinned by up to about 95% during the redrawing step.

19. The method according to claim 8, wherein the ion exchange step comprises replacing a relatively smaller alkali metal cation in the chemically redrawn glass part with a relatively larger cation.

20. The method of claim 8, further comprising, prior to the subjecting the chemically etched redrawn glass part to an ion exchange step, pre-heating the chemically etched redrawn glass part to a temperature in a range of about 250° C. to about 500° C. over a period of time from about 20 minutes to about 4 hours.

\* \* \* \* \*